Sept. 4, 1962 J. A. NAY 3,052,839
CONDUCTIVITY CELL TESTER
Filed April 17, 1959
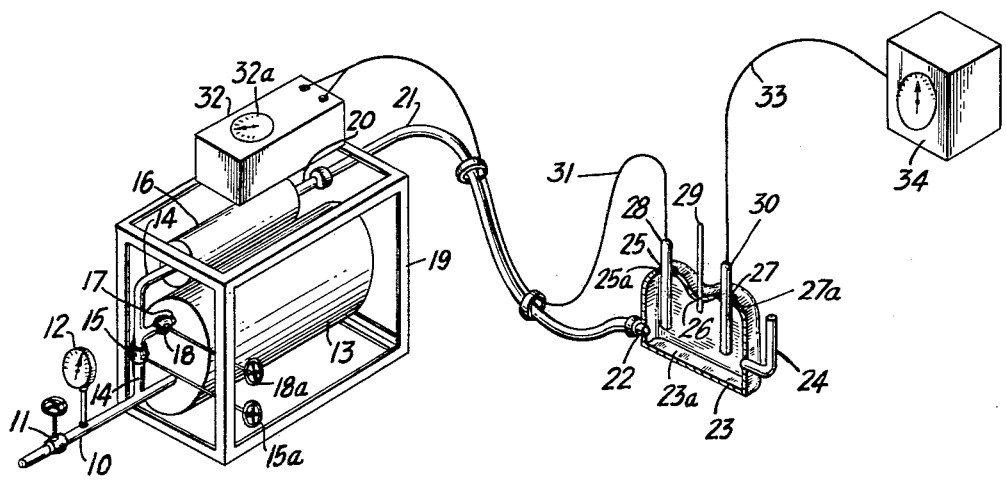
INVENTOR.
JAMES A. NAY
BY
Brumbaugh, Free, Graves & Donohue
his ATTORNEYS

United States Patent Office 3,052,839
Patented Sept. 4, 1962

3,052,839
CONDUCTIVITY CELL TESTER
James A. Nay, Montville, Conn., assignor to General Dynamics Corporation, New York, N.Y., a corporation of Delaware
Filed Apr. 17, 1959, Ser. No. 807,060
4 Claims. (Cl. 324—30)

This invention relates to a unit for testing the calibration of conductivity cells.

Conductivity cells are widely used to monitor or test the purity or concentration of various liquids. Periodically the cells must be checked for accuracy and preferably at their situs of operation while connected to their own indicating unit.

Prior tests of conductivity cells required the use of a liquid sample having a certain purity or concentration in which the cell under test was immersed. However, in checking the calibration of cells ordinarily used to measure low conductivities, such as so-called salinity cells which are conductivity cells having an indicating unit calibrated in parts per million (p.p.m.) by weight of equivalent chlorides, the pure water samples required were extremely susceptible to pollution from handling or from the air when opened to receive the cell under test.

In addition to pollution of relatively pure samples, inaccuracies were introduced into conductivity cell tests by the presence of air bubbles or small particles clinging to the cell when dipped into a stagnant sample. Such inaccuracies were particularly troublesome when the cell under test ordinarily was positioned in a flowing liquid which washed away such air bubbles or small particles.

The present invention overcomes the above-discussed testing difficulties and enables accurate checking of conductivity cells at their normal situs in a flowing liquid. In particular, the invention contemplates the use of a chamber through which is flowed liquid having a selected purity or concentration measured by a standard cell communicating with the chamber. Another opening in the chamber is adapted to receive a test cell to enable the operator to compare conductivity indications of the standard cell with those of the cell under test. A thermometer well may also be provided in the chamber to enable temperature compensation of the readings obtained.

Positioning the test cell adjacent to the standard cell in the test chamber eliminates the possibility of contamination of the liquid as it flows from one cell to the other. Moreover, the flowing liquid minimizes air bubbles and particles on the cells which in the past have contributed to inaccurate readings.

These and further advantages of the present invention will be more readily understood when the following description is read in connection with the accompanying drawings, in which the single FIGURE is a perspective view, partially broken away, of a test unit constructed in accordance with the principles of the present invention.

Referring to an illustrative embodiment of the invention in greater detail with particular reference to the drawing, an input line 10 adapted to be coupled to a source of liquid such as water, incorporates a valve 11 and a pressure gauge 12. The line 10 communicates with a purifying device such, for example, as a demineralizer 13, and also with a branch or bypass line 14, carrying a bypass valve 15, which leads into a mixing chamber 16. Flow from the demineralizer 13 to the branch line 14 in an output line 17 is controlled by a valve 18.

A suitable frame structure 19 mounts and protects the demineralizer 13 and the mixing chamber 16. Valve handles 15a and 18a are extended to convenient locations outside of the frame 19 to enable control of flow to and from the demineralizer 13 to the mixing chamber 16.

An exemplary type of demineralizer of conventional design purifies water by passing it through resin beds. The molecules of the various salts dissolved in the water comprise positively and negatively charged ions. The resin beds chemically exchange ions to remove effectively minerals such as chlorides, calcium, sodium, potassium, magnesium, iron, copper, sulfates, bicarbonates, carbonates, etc. from the water. Thus, the sodium chloride in water ionizes into a positive ion $Na+$ and a negative ion $Cl-$. In a first cation resin bed the positive ion $Na+$ (termed a cation) is captured and replaced with a hydrogen ion $H+$ in the water. The hydrogen ion joins the negative ion $Cl-$ (termed an anion) in the water, thus forming hydrochloric acid HCl. The water, now containing HCl instead of NaCl, then passes through a second resin bed in which an anion resin absorbs the acid formed by the cation resin.

Instead of using two separate resin beds, a mixed bed demineralizer employing one resin bed in which the cation and anion resins are thoroughly mixed may also be used for demineralization. While flowing through such resin bed, the water alternately contacts large numbers of cation and anion resin particles which produces demineralized water of high purity. Demineralizers as described herein are made available by Barnstead Still and Demineralizer Company. For example, their Model BD-2 Cartridge-Type Demineralizer may be used in the inventive test unit.

Other liquid purifiers may also be used in accordance with the nature of the liquid which must be supplied to the conductivity cells.

An output line 20 conducts liquid from the mixing chamber 16 through a flexible tube 21 to an inlet 22 communicating with a housing 23 forming a test chamber 23a. A J-shaped outlet 24 on the other side of the chamber 23a extends upwardly to maintain a suitable liquid level therein. The end of the outlet 24 is adapted to be connected to a drain hose.

Three openings 25, 26 and 27 in the chamber 23a respectively receive a standard cell 28, a thermometer 29 and a test cell 30. Gaskets 25a and 27a in the housing opening 25 and 27 secure the cells 29 and 30 in position. Other suitable arrangements may, of course, be used.

The standard cell 28 is connected by a cable 31, preferably attached to the flexible tube 21, in circuit with a conductivity bridge 32 incorporating an indicator 32a mounted on the frame 19. Such conductivity cells and indicating bridge circuits are well known and conventional units are utilized in the present invention.

A cable 33 leads from the test cell 30 to an indicator circuit and indicator 34 normally connected thereto and mounted on or adjacent to the chamber in which the liquid monitored by the cell 30 is located.

In operation, assuming the unit is to be used to test a salinity cell normally monitoring the conductivity of relatively pure water, the tester is readily carried to the situs of the salinity cell to be checked, the cell 30 positioned in the opening 27 in the test chamber 23a and the inlet line 10 coupled to a source of relatively pure water such as tap water. The valve 11 is then adjusted to provide a predetermined pressure on the gauge 12 at which time water flows through the demineralizer 13 and the lines 17 and 14 to the mixing chamber 16. Water also flows directly to the mixing chamber 16 through the branch line 14 if the valve 15 is open. The demineralized water flowing from the chamber 13 is exceptionally pure containing as little as one-tenth part per million (p.p.m.) by weight of equivalent chlorides.

In measuring the salinity of water no distinction is made between conductivity caused by salt and that caused by contaminants therein such as boiler water treatment chemicals, carbon dioxide and oxygen from the atmosphere, and other impurities. Thus, conductivity indications are treated as if caused by salt and read as parts per million (p.p.m.) by weight of the chloride portion of sodium chloride. Since 60% of the weight of sodium chloride is chlorine and 40% is sodium, for a particular concentration of sodium chloride the p.p.m of the chloride portion is 0.6 times the total p.p.m. of sodium chloride.

Ordinarily the valve 15 is closed and the valve 18 open initially to flow pure water through the test chamber 23a until the system is rinsed sufficiently to provide a reading on the indicator 32a below the desired test value. The bypass valve 15 is then adjusted until the indicator 32a reads a desired p.p.m.; i.e., the selected purity of the water flowing through the chamber 23a. At the same time, the indicator 34 is observed and its reading compared with that of the indicator 32a to determine the accuracy of calibration of the test cell 30. The thermometer reading is also observed and the necessary temperature compensation setting made in the circuits 32 and 34, if necessary.

The valves 15 and 18 may be adjusted to provide a flow through the flexible tube 21 to the test chamber 23a of a conductivity corresponding to 1 p.p.m. of chlorides or less, depending on the efficiency of the demineralizer 13, to the conductivity of tap water or other water supplied to the inlet pipe 10. Therefore, the inventive cell tester may be used to test a wide range of salinity cells at their normal situs. Of course, the test chamber 23 may incorporate additional openings to fit additional cells of the same or different sizes to provide greater versatility for the unit.

The nature of use of the conductivity cells tested determines the characteristics of the purifying chamber 13. It should be of a type to provide a suitable liquid at its output which, alone or mixed with input liquid, will subject the conductivity cells in the test chamber 23a to a flow of liquid of selected conductivity.

It will be understood that the above-described embodiment of the invention is illustrative only and modifications thereof will occur to those skilled in the art. Therefore, the invention is not to be limited to the specific apparatus disclosed herein, but is to be defined by the appended claims.

I claim:

1. A test unit for conductivity cells comprising a housing forming a chamber having an inlet and an outlet, a standard cell to measure the conductivity of liquid flowing through the chamber, an opening in the chamber adapted to receive a cell under test, means to flow liquid of a desired purity to the chamber inlet, the standard cell and the cell under test each being exposed to the desired purity liquid, and indicating means responsive to signals from the standard cell to indicate the conductivity of the liquid flowing through the chamber.

2. A test unit for conductivity cells comprising a housing forming a chamber having an inlet and an outlet, a standard cell to measure the conductivity of liquid flowing through the chamber, an opening in the chamber adapted to receive a cell under test, liquid purification means adapted to be connected to a liquid source to supply liquid of a desired purity to the chamber inlet, the standard cell and the cell under test each being exposed to the desired purity liquid, and indicating means responsive to signals from the standard cell to indicate the conductivity of the liquid flowing through the chamber.

3. A test unit for conductivity cells comprising a housing forming a test chamber having an inlet and an outlet, a standard cell to measure the conductivity of liquid flowing through the test chamber, an opening in the test chamber adapted to receive a cell under test, a demineralizer adapted to be connected to a liquid source, a mixing chamber, a demineralizer output line coupled to the mixing chamber, a valve controlled line bypassing the demineralizer adapted to flow desired quantities of liquid from the liquid source directly to the mixing chamber, a line flowing liquid of a desired purity from the mixing chamber to the test chamber inlet, the standard cell and the cell under test each being exposed to the desired purity liquid, and indicating means responsive to signals from the standard cell to indicate the conductivity of the liquid flowing through the test chamber.

4. Apparatus as defined in claim 3, in which a thermometer well provided in the housing is adapted to receive a thermometer to indicate the temperature of the liquid flowing through the test chamber.

References Cited in the file of this patent

UNITED STATES PATENTS

| | | |
|---|---|---|
| 719,968 | Wood | Feb. 3, 1903 |
| 2,422,054 | Tiger | June 10, 1947 |
| 2,468,791 | Thomson | May 3, 1949 |
| 2,617,766 | Emmett et al. | Nov. 11, 1952 |
| 2,715,331 | Yates et al. | Aug. 16, 1955 |